(12) United States Patent
Murashige et al.

(10) Patent No.: US 9,783,449 B2
(45) Date of Patent: Oct. 10, 2017

(54) THIN GLASS ELONGATED BODY

(71) Applicant: NITTO DENKO CORPORATION, Ibaraki-shi, Osaka (JP)

(72) Inventors: Takeshi Murashige, Ibaraki (JP); Junichi Inagaki, Ibaraki (JP); Seong Jin Ryu, Ibaraki (JP); Hiroyuki Takemoto, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 151 days.

(21) Appl. No.: 14/435,341

(22) PCT Filed: Oct. 18, 2013

(86) PCT No.: PCT/JP2013/078367
§ 371 (c)(1),
(2) Date: Apr. 13, 2015

(87) PCT Pub. No.: WO2014/061800
PCT Pub. Date: Apr. 24, 2014

(65) Prior Publication Data
US 2015/0232371 A1    Aug. 20, 2015

(30) Foreign Application Priority Data

Oct. 19, 2012 (JP) ................. 2012-231998

(51) Int. Cl.
C03B 35/14 (2006.01)
C03C 27/10 (2006.01)
(Continued)

(52) U.S. Cl.
CPC .......... *C03B 35/14* (2013.01); *B29C 65/5057* (2013.01); *B29C 66/43* (2013.01);
(Continued)

(58) Field of Classification Search
CPC ...... C03B 35/14; B29C 65/5057; B29C 66/43
(Continued)

(56) References Cited

U.S. PATENT DOCUMENTS 8,241,751 B2    8/2012    Tomamoto et al.
8,497,006 B2    7/2013    Tomamoto et al.
(Continued)

FOREIGN PATENT DOCUMENTS

EP    0 716 339 A1    6/1996
EP    0 716 339 B1    9/2001
(Continued)

OTHER PUBLICATIONS

Office Action dated Feb. 26, 2016, issued in counterpart Korean Patent Application No. 10-2015-7009861, with English translation (15 pages).
(Continued)

*Primary Examiner* — Brent O'Hern
(74) *Attorney, Agent, or Firm* — Westerman, Hattori, Daniels & Adrian, LLP (57) ABSTRACT

There is provided a thin glass elongated body that can be prevented from being broken when subjected to processing or treatment by a roll-to-roll process. A thin glass elongated body of the present invention includes: a main body that includes an elongated thin glass; and a handling section that includes tough films connected to both ends of the main body in a length direction of the main body.

13 Claims, 4 Drawing Sheets

(51) Int. Cl.
  *B29C 65/50* (2006.01)
  *B29C 65/00* (2006.01)
  *B29K 105/00* (2006.01)
  *B29K 67/00* (2006.01)
  *B29K 709/08* (2006.01)

(52) U.S. Cl.
  CPC ........ *C03C 27/10* (2013.01); *B29K 2067/003* (2013.01); *B29K 2105/256* (2013.01); *B29K 2709/08* (2013.01); *C03B 2225/00* (2013.01); *Y10T 428/18* (2015.01)

(58) Field of Classification Search
  USPC .......................................................... 428/54
  See application file for complete search history.

(56) References Cited

U.S. PATENT DOCUMENTS

| | | |
|---|---|---|
| 8,806,894 B2 | 8/2014 | Tomamoto et al. |
| 9,028,940 B2 | 5/2015 | Hasegawa et al. |
| 2009/0288777 A1 | 11/2009 | Odawara et al. |
| 2011/0114160 A1 | 5/2011 | Murashige et al. |
| 2011/0177290 A1 | 7/2011 | Tomamoto et al. |
| 2011/0177325 A1 | 7/2011 | Tomamoto et al. |
| 2011/0177347 A1 | 7/2011 | Tomamoto et al. |
| 2011/0192878 A1 | 8/2011 | Teranishi et al. |
| 2011/0200812 A1 | 8/2011 | Tomamoto et al. |
| 2011/0244225 A1 | 10/2011 | Hattori et al. |
| 2012/0015132 A1* | 1/2012 | Hasegawa .............. B65H 21/00 428/61 |
| 2014/0319001 A1 | 10/2014 | Tomamoto et al. |
| 2016/0016746 A1 | 1/2016 | Teranishi et al. |

FOREIGN PATENT DOCUMENTS

| | | | |
|---|---|---|---|
| JP | 1-500990 A | 4/1989 | |
| JP | 8-283041 A | 10/1996 | |
| JP | 2007-10834 A | 1/2007 | |
| JP | 2008-100361 A | 5/2008 | |
| JP | 2009-282509 A | 12/2009 | |
| JP | WO 2010038761 A1 * | 4/2010 | ............ C03B 17/06 |
| KR | 10-2011-0061517 A | 6/2011 | |
| TW | 201018653 A | 5/2010 | |
| TW | 201213217 A | 4/2012 | |
| WO | 87/06626 A1 | 11/1987 | |
| WO | 2012/008529 A1 | 1/2012 | |
| WO | 2012074971 A2 | 6/2012 | |
| WO | 2012090693 A1 | 7/2012 | |
| WO | 2010/038761 A1 | 4/2014 | |

OTHER PUBLICATIONS

International Search Report dated Jan. 7, 2014 issued in corresponding application No. PCT/JP2013/078367.

Extended European Search Report dated Oct. 20, 2016, issued in counterpart European patent application No. 13847873.0 (in English; 7 pages).

Office Action dated Jan. 25, 2017, issued in counterpart Japanese patent application No. 2013-217713 (w/ English translation; 11 pages).

Office Action dated Jan. 20, 2017, issued in counterpart Taiwanese patent application No. 102137876 (w/ English translation; 10 pages).

* cited by examiner

THIN GLASS ELONGATED BODY

TECHNICAL FIELD

The present invention relates to a thin glass elongated body.

BACKGROUND ART

In recent years, light-weighting and thinning of a display device, an illumination device, and a solar battery have been progressed from the viewpoint of transportation, storage, design, and the like. Further, continuous production has also been carried out to manufacture a film-shaped member to be used in those devices by a roll-to-roll process. For example, as a flexible material that may be subjected to processing or treatment by the roll-to-roll process, the use of a thin glass has been proposed (for example, Patent Literatures 1 and 2).

The thin glass is extremely fragile, resulting in a poor handling property. As a member to be used in the above-mentioned devices, for example, there has been proposed a flexible substrate enhanced in handling property by adhering a resin film onto a surface of the thin glass so as to reinforce the thin glass (for example, Patent Literature 3). However, it is extremely difficult to handle a thin glass alone as a material without breaking the thin glass throughout steps of manufacturing such a member as described above. Specifically, in the case where the thin glass alone is subjected to the processing or the treatment by the roll-to-roll process, there are problems in that a thin glass is liable to be broken when being set in a device in an initiation stage, resulting in a poor handling property, the thin glass is liable to be broken in a termination stage, and in that the thin glass is liable to be broken when being cut to be divided in a take-up part. Further, there is also a problem in that, due to the fragility of the thin glass, the thin glass is difficult to process by elongating and/or widening the thin glass, thereby hindering improvement in productivity.

CITATION LIST

Patent Literature

[PTL 1] JP 01-500990 A
[PTL 2] JP 08-283041 A
[PTL 3] JP 2007-010834 A

SUMMARY OF INVENTION

Technical Problems

The present invention has been made to solve the above-mentioned problems inherent in the related art, and an object of the present invention is to provide a thin glass elongated body that can be prevented from being broken when subjected to processing or treatment by a roll-to-roll process.

Solution to Problems

A thin glass elongated body according to an embodiment of the present invention includes:
a main body including an elongated thin glass; and
a handling section including tough films connected to both ends of the main body in a length direction thereof.

In one embodiment of the invention, the main body includes a plurality of main bodies and the handling section includes a plurality of handling sections, and the plurality of main bodies and the plurality of handling sections are arranged alternately in the length direction.

In one embodiment of the invention, the plurality of main bodies are formed at an interval of 50 cm or more.

In one embodiment of the invention, the elongated thin glass has a thickness of from 10 μm to 150 μm.

In one embodiment of the invention, the elongated thin glass has a width of 300 μm or more.

In one embodiment of the invention, the elongated thin glass and the tough films are superimposed with each other in a connecting portion between the elongated thin glass and the tough films, and a length x of the connecting portion, at which the elongated thin glass and the tough films are superimposed with each other, and a width y of the elongated thin glass satisfy a relationship of $0.01y \leq x \leq y$.

In one embodiment of the invention, a product of a Young's modulus and a thickness of each of the tough films is smaller than a product of a Young's modulus and a thickness of the elongated thin glass.

In one embodiment of the invention, a material forming the each of the tough films includes a resin or a metal.

In one embodiment of the invention, the each of the tough films has a fracture toughness value of from $2\ \text{MPa·m}^{1/2}$ to $20\ \text{MPa·m}^{1/2}$.

In one embodiment of the invention, a coefficient of linear expansion of the each of the tough films in a width direction thereof is one time to ten times as large as a coefficient of linear expansion of the elongated thin glass.

In one embodiment of the invention, the thin glass elongated body is formed into a roll shape.

Advantageous Effects of Invention

According to the one embodiment of the present invention, it is possible to provide the thin glass elongated body including the tough films at both ends of the elongated thin glass in the length direction so that the thin glass is not liable to be broken when subjected to the processing or the treatment continuously.

DESCRIPTION OF EMBODIMENTS

Figure 1:
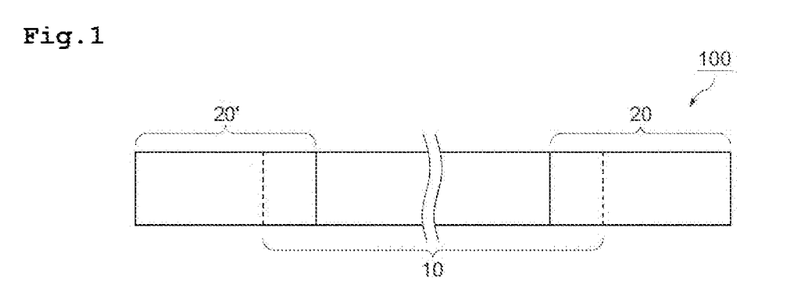
FIG. 1 is a schematic plan view of a thin glass elongated body according to a preferred embodiment of the present invention.

FIG. 1 is a schematic plan view of a thin glass elongated body according to a preferred embodiment of the present invention. A thin glass elongated body 100 includes a main body formed of an elongated thin glass 10 and handling sections formed of tough films 20 and 20' connected to both ends of the thin glass in a length direction.

In practical use, the thin glass elongated body may be provided in a state of being taken up into a roll shape. The roll-shaped thin glass elongated body is subjected to processing or treatment by a roll-to-roll process. Note that, the rolled thin glass elongated body as used herein is simply referred to as "roll" so as to be distinguished from processing rolls (such as a conveyance roll and a heating roll) installed in a processing/treatment device.

Figure 2:
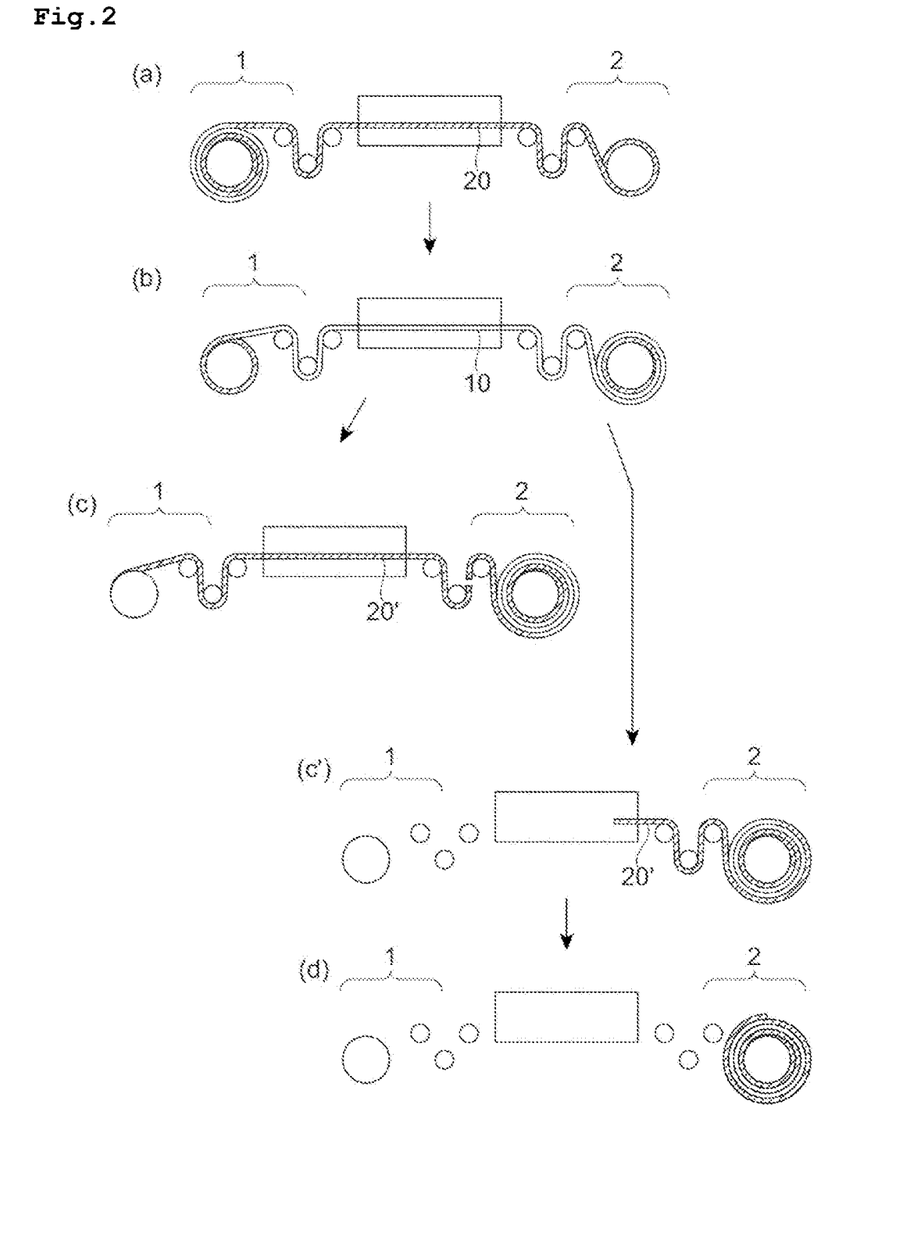
FIG. 2 are views illustrating an example of the usage of the thin glass elongated body of the present invention.

FIG. 2 are views illustrating an example of the usage of the thin glass elongated body of the present invention, in which steps of feeding the thin glass of the thin glass elongated body to the treatment device for the roll-to-roll process are illustrated. FIG. 2(a) illustrates a stage (initiation stage) before the treatment (such as applying, sputtering, and heat treatment) of the thin glass 10 becomes a steady state. In the initiation stage, the thin glass elongated body 100 is set in the treatment device through operations involving an operation of feeding the thin glass elongated body 100 from the roll on a feed side 1, an operation of causing the fed elongated body to pass through the treatment device, an operation of rolling the elongated body on a take-up side 2, and the like. When the thin glass elongated body 100 of the present invention is used, an operator can perform an operation by holding the handling section (tough film 20) instead of the thin glass 10 in the initiation stage of the treatment, and hence the breakage of the thin glass 10 can be prevented. Further, the alignment can be adjusted through use of the tough film 20, and hence the breakage of the thin glass 10 caused by the adjustment can also be prevented. Further, in the case where a processing condition (for example, a processing speed) is changed when the processing and treatment shift to the steady state, a load caused by the change can be prevented from being applied to the thin glass 10.

Then, the treatment of the thin glass 10 is performed (FIG. 2 (b)). After the treatment of the thin glass 10 is completed, the elongated body is cut on the take-up side 2, and the roll is removed (FIG. 2(c)). In this case, the tough film 20' can be cut instead of the thin glass 10 when the thin glass elongated body of the present invention is used, and hence the breakage of the thin glass caused by cutting can be prevented. After cutting, a trailing end of the tough film 20' remaining on the device may be connected to a leading end of a roll to be subjected to treatment subsequently. With this, the operability of the passage of the elongated body becomes satisfactory. Further, the entire thin glass elongated body 100 may be caused to pass through the treatment device without cutting the tough film 20' (FIGS. 2(c)' and 2(d)). The thin glass elongated body of the present invention includes the tough film also at a rearmost end. Therefore, the entire elongated body can be caused to pass through the treatment device, resulting in an excellent operability and a reduction in manufacturing loss.

The thin glass elongated body of the present invention includes the handling sections formed of the tough films at both ends in the length direction, and hence, as described above, the breakage of the thin glass can be prevented in both the initiation stage and the termination stage of the processing or the treatment. Further, the thin glass elongated body of the present invention includes the tough films at both ends in the length direction. Therefore, after one step is completed, the roll after the completion of the step can be directly subjected to a subsequent step, resulting in an excellent operability. Also in the subsequent step, the breakage of the thin glass can be prevented in both the initiation stage and the termination stage of the processing or the treatment.

Figure 3:
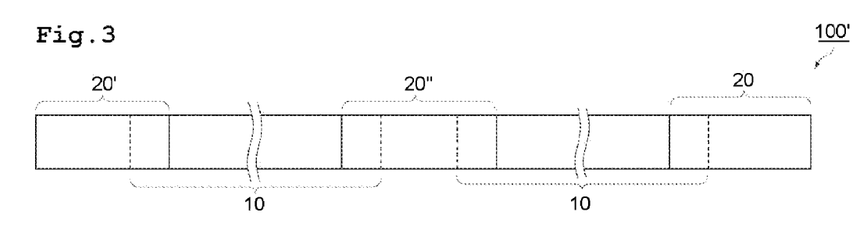
FIG. 3 is a schematic plan view of a thin glass elongated body according to another preferred embodiment of the present invention.

FIG. 3 is a schematic plan view of a thin glass elongated body according to another preferred embodiment of the present invention. A thin glass elongated body 100' of the present invention may include a tough film 20" having the thin glasses 10 connected to both ends thereof in the length direction. That is, in one embodiment, the thin glass elongated body of the present invention includes a plurality of main bodies (thin glasses 10), and the handling sections (tough films) are connected to both ends of each of the plurality of main bodies (thin glasses 10) in the length direction so that the plurality of main bodies (thin glasses 10) are integrated. More specifically, in the thin glass elongated body according to this embodiment, the handling sections (tough films) and the main bodies (thin glasses) are arranged alternately in the length direction as in the order of handling section (tough film), main body (thin glass), handling section (tough film), main body (thin glass), and handling section (tough film). The thin glass elongated body includes portions each including the handling section (tough film) and the main body (thin glass), which are continuous in the length direction, that is, continuous portions each including the handling section (tough film) and the main body (thin glass) as a repeating unit. Also in the case where the thin glass elongated body includes the continuous portions, both the end portions of the thin glass elongated body in the length direction are formed of the handling sections (tough films). When the thin glass elongated body includes the continuous portions as described above, a plurality of the handling sections (tough films) can be cut to divide the thin glass elongated body. The number of the repeating units can beset in accordance with a desired number of segments to be divided. The number of the repeating units may be set to, for example, from 2 to 30. The tough film 20" other than the tough films 20 and 20' located at both the end portions of the thin glass elongated body in the length direction is also hereinafter referred to as "intermediate tough film".

As descried above, in the case where the handling sections (tough films) and the main bodies (thin glasses) are arranged alternately in the length direction, an interval between the main bodies is preferably 50 cm or more.

Figure 4:
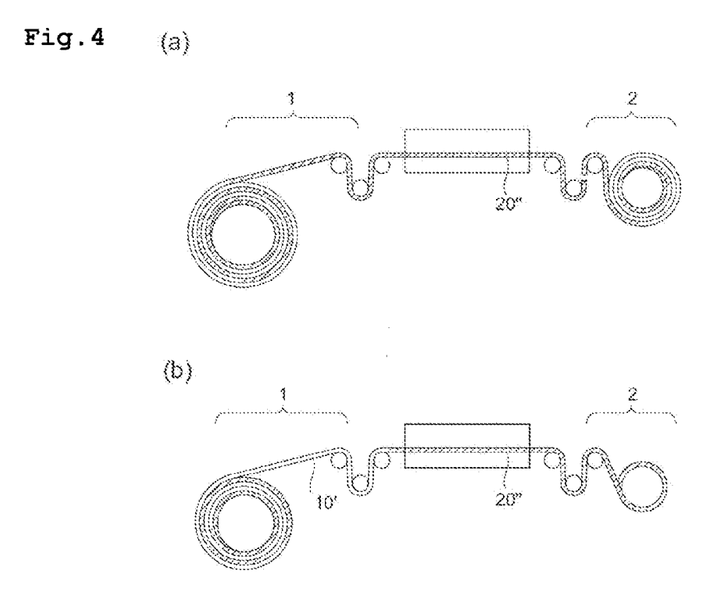
FIG. 4 are views illustrating an example of the usage of the thin glass elongated body of the present invention.

FIG. 4 are views illustrating an example of the usage of the thin glass elongated body of the present invention, in which steps of feeding the thin glass of the thin glass elongated body to the treatment device for the roll-to-roll process are illustrated. Note that, in the thin glass elongated body of FIG. 4, the shaded portion denotes the tough film, and the non-shaded portion denotes the thin glass. In this embodiment, the thin glass elongated body including the continuous portions each including the handling section (tough film) and the main body (thin glass) as the repeating unit as described is set on the feed side 1. This embodiment includes a treatment step of treating the thin glass of the thin glass elongated body including the continuous portions and a cutting step of cutting the intermediate tough film after the treatment. By repeating the treatment step and the cutting step, the thin glass elongated body before the treatment, which has been prepared with a large diameter, can be divided into treated thin glass elongated bodies. More specifically, after the treatment of the thin glass (first thin glass), which is first subjected to the treatment, is completed, the intermediate tough film 20" is cut on the take-up side 2 (FIG. 4(a)), and thereafter the roll on the take-up side 2 is removed from the device. Then, the intermediate tough film 20" remaining on the inside of the device is rolled, and a second thin glass 10 is treated (FIG. 4(b)). The operations of FIGS. 4(a) and 4(b) are repeated in accordance with the number of thin glasses, and thus the thin glass elongated body before the treatment, which has been prepared with a large diameter, can be divided into the treated thin glass elongated bodies. The thin glass elongated body including the continuous portions each including the handling section (tough film) and the main body (thin glass) as the repeating unit is excellent in operability of a re-rolling operation at a time of division. Note that, although FIG. 4 does not illustrate the operations in the initiation stage and the termination stage of the treatment, the operations are similar to those described with reference to FIG. 2.

The thin glass elongated body including the continuous portions each including the handling section (tough film) and the main body (thin glass) as the repeating unit can be subjected to any appropriate treatment such as the lamination of a resin film, easy-adhesion treatment, applying, sputtering, and heat treatment. When the thin glass elongated body including the continuity portion is used, even if thin glass has a relatively small length, the thin glass can be elongated to be subjected to the step (roll-to-roll process) of the processing or the treatment, and thereby enhancing the production efficiency. Further, when the above-mentioned thin glass elongated body is used in a step of cutting the thin glass itself as in the related art such as the case where a roll after the processing or the treatment is required to be divided, the complexity at a time of cutting is alleviated. Further, the operability at a time of proceeding to a subsequent step after cutting is also enhanced.

<Thin Glass>

As the thin glass, any appropriate thin glass may be adopted as long as the thin glass has a plate shape. As the thin glass, according to the classification based on a composition, there are given, for example, soda-lime glass, boric acid glass, aluminosilicate glass, quartz glass, and the like. Further, according to the classification based on an alkaline component, there are given alkali-free glass and low-alkali glass. Preferably, the alkali-free glass is used. This is because the alkali-free glass is excellent in strength and chemical durability. In the case where the thin glass elongated body includes a plurality of thin glasses, the plurality of thin glasses may be those belonging to the same classification or those belonging to different classifications.

As a method of forming the thin glass, any appropriate method may be adopted. Typically, the thin glass is manufactured by melting a mixture containing main raw materials such as silica and alumina, an antifoaming agent such as a salt cake and antimony oxide, and a reducing agent such as carbon at temperature of from 1,400° C. to 1,600° C. so as to form the mixture into a thin plate shape, and cooling the resultant. As a method of forming the thin glass into a thin plate, there are given, for example, a slot down-draw method, a fusion method, a float method, and the like. The thin glass formed into a plate shape by those methods may be reduced in thickness or subjected to chemical polishing with a solvent such as hydrofluoric acid, as necessary, in order to increase the smoothness of a surface and an end portion.

The thickness of the thin glass is preferably from 10 µm to 150 µm, more preferably 20 µm to 120 µm, still more preferably 30 µm to 100 µm. In the case where the thickness of the thin glass is more than 150 µm, the thin glass does not have sufficient flexibility, and there is a risk in that the thin glass may be difficult to take up into a roll shape. Further, in the case where the thickness of the thin glass is less than 10 µm, there is a risk in that the handling may be difficult. In the case where the thin glass elongated body includes a plurality of thin glasses, the dimensions (thickness, length) of the plurality of thin glasses may be the same or different.

The width of the thin glass is preferably 300 mm or more, more preferably 400 mm or more. In general, a wide thin glass is difficult to handle because a significant load is applied to the thin glass when the thin glass is twisted or deflected under the self weight. The present invention exhibits the effect markedly in the processing or the treatment of the wide thin glass, which is usually difficult to handle. An upper limit of the width of the thin glass is preferably 2,000 mm, more preferably 1,500 mm or less, still more preferably 1,200 mm or less.

The length of the thin glass may be set to any appropriate length in accordance with a desired treatment or processing amount. For example, the thin glass having a length of from 5 m to 1,000 m may be used. In the case where the thin glass elongated body includes one thin glass, the length of the thin glass is, for example, from 30 m to 1,000 m. In the case where the thin glass elongated body includes a plurality of thin glasses, the length of each thin glass is, for example, from 5 m to 500 m.

A surface of the thin glass may be protected with a resin film or the like. As long as the surface is protected, even in the case where the thin glass ruptures during conveyance, the operation of the device can be continued without suspending the conveyance of the thin glass elongated body.

<Tough Film>

As a material forming the tough film, any appropriate material may be selected as long as the effect of the present invention is obtained. As the material forming the tough film, a material having higher toughness than that of the thin glass is used, and examples thereof include a resin and a metal. Examples of the resin include a polyethylene terephthalate-based resin, a polyimide-based resin, a polyamide-based resin, a polyethylene naphthalate-based resin, a polycarbonate-based resin, and a cycloolefin-based resin. Of those, a polyethylene terephthalate-based resin is preferably used. Examples of the metal include aluminum, a stainless steel, copper, iron, and lead. Of those, aluminum or a stainless steel is preferably used. The thin glass elongated body of the present invention includes a plurality of tough films, and the plurality of tough films may be formed of the same material or different materials.

A fracture toughness value of the tough film is preferably from 2 $MPa \cdot m^{1/2}$ to 20 $MPa \cdot m^{1/2}$, more preferably from 5 $MPa \cdot m^{1/2}$ to 20 $MPa \cdot m^{1/2}$, particularly preferably from 10 $MPa \cdot m^{1/2}$ to 20 $MPa \cdot m^{1/2}$.

The thickness of the tough film is preferably from 5 µm to 500 µm. When the tough film is formed of the resin, the thickness of the tough film is preferably from 10 µm to 200 µm, more preferably from 30 µm to 100 µm. When the tough film is formed of the metal, the thickness of the tough film is more preferably from 5 µm to 200 µm, still more preferably from 10 µm to 100 µm, particularly preferably from 30 µm to 50 µm. The tough film having a thickness within the above-mentioned range is excellent in a handling property due to the weight and is easily cut. In addition, the formation of wrinkles and the rupture can be prevented. Therefore, the tough film having a thickness within the above-mentioned range is preferred as the tough film for the thin glass elongated body of the present invention. The dimensions (thickness, length) of the plurality of tough films may be the same or different.

It is preferred that the material and thickness of the tough film be selected so that the bending stress of a surface (convex side) of the tough film caused when the thin glass elongated body is taken up is smaller than that of a surface (convex side) of the thin glass. More specifically, it is preferred that a product of the Young's modulus and the thickness of the tough film be smaller than that of the Young's modulus and the thickness of the thin glass. The product (GPa·μm) of the Young's modulus and the thickness of the tough film is preferably 90% or less, more preferably 80% or less, still more preferably 70% or less, particularly preferably 60% or less, most preferably 50% or less with respect to the product (GPa·μm) of the Young's modulus and the thickness of the thin glass. The tough film described above is preferred because a load caused by bending is less liable to be applied to the tough film than in the case of the thin glass. Further, when the tough film that is bent more easily than the thin glass is used, sufficient flexibility is exhibited also in a connecting portion between the thin glass and the tough film, and the breakage of the thin glass in the connecting portion can be prevented. Note that, the Young's modulus herein refers to a value calculated from a maximum tangent gradient in a stress-strain (S-S) curve obtained by stretching a strip sample having a width of 10 mm at 23° C., a chuck distance of 50 mm, and a speed of 300 mm/min.

The width of the tough film is preferably from 300 mm to 2,000 mm, more preferably from 300 mm to 1,500 mm, still more preferably from 400 mm to 1,200 mm. The absolute value of the difference between the width of the thin glass and the width of the tough film is preferably 20 mm or less, more preferably 10 mm or less, still more preferably 5 mm or less, particularly preferably 1 mm or less, most preferably 0 mm. As the absolute value of the difference between the width of the thin glass and the width of the tough film is smaller, the alignment is more easily adjusted at a time of the processing or the treatment.

The coefficient of linear expansion of the tough film in a width direction is preferably 50 ppm/° C. or less, more preferably from 10 ppm/° C. to 30 ppm/° C. Further, the coefficient of linear expansion of the tough film in the width direction is preferably one time to ten times, more preferably two times to ten times as large as the coefficient of linear expansion of the thin glass. As long as the coefficient of linear expansion of the tough film in the width direction falls within the above-mentioned range, even in the case where the thin glass elongated body is subjected to the heat treatment step, the absolute value of the difference between the width of the thin glass and the width of the tough film can be maintained to be small, and the formation of curls and the breakage of the thin glass can be prevented.

The coefficient of linear expansion of the tough film in a length direction is preferably 50 ppm/° C. or less, more preferably from 10 ppm/° C. to 30 ppm/° C. Further, the coefficient of linear expansion of the tough film in the length direction is preferably one time to ten times, more preferably two times to ten times as large as the coefficient of linear expansion of the thin glass. As long as the coefficient of linear expansion of the tough film in the length direction falls within the above-mentioned range, even in the case where the thin glass elongated body is subjected to the heat treatment step, the breakage of the thin glass can be prevented.

The coefficient of thermal shrinkage of the tough film in the width direction when heated at 150° C. for 30 minutes is preferably 10% or less, more preferably 5% or less, still more preferably 1% or less. As long as the coefficient of thermal shrinkage of the tough film falls within the above-mentioned range, even in the case where the thin glass elongated body is subjected to the heat treatment step, the absolute value of the difference between the width of the thin glass and the width of the tough film can be maintained to be small, and the formation of curls and the breakage of the thin glass can be prevented.

The coefficient of thermal shrinkage of the tough film in the length direction when heated at 150° C. for 30 minutes is preferably 10% or less, more preferably 5% or less, still more preferably 1% or less. As long as the coefficient of thermal shrinkage of the tough film falls within the above-mentioned range, even in the case where the thin glass elongated body is subjected to the heat treatment step, the breakage of the thin glass can be prevented.

The tough film having a small coefficient of linear expansion and/or coefficient of thermal shrinkage as described above can be obtained, for example, by using a resin subjected to stretching treatment as a forming material. For example, in the case of using a PET film as the tough film, a film stretched by two times to twenty times in a transverse direction (TD) and by two times to twenty times in a machine direction (MD) is preferred as the PET film.

It is preferred that the length of the tough film located at both the end portions of the thin glass elongated body in the length direction be equal to or more than the length (length from feed to take-up) of the device in which the thin glass elongated body is set. When the length of the tough film located at both the end portions of the thin glass elongated body in the length direction is equal to or more than the length of the device, a thin glass elongated body excellent in operability in the initiation stage and the termination stage of the processing or the treatment can be obtained. The length of the tough film located at both the end portions of the thin glass elongated body in the length direction is, for example, from 5 m to 200 m.

The length of the intermediate tough film is preferably from 50 cm to 200 m. The length of the intermediate tough film may be set in accordance with the presence or absence and the type of the post-process to be performed on the thin glass elongated body after the treatment.

The thin glass and the tough film can be connected to each other through use of, for example, any appropriate pressure-sensitive adhesive tape, double-sided adhesive tape, adhesive, or the like. The thin glass and the tough film can be connected to each other, for example, so that the thin glass and the tough film are superimposed with each other.

Figure 5:
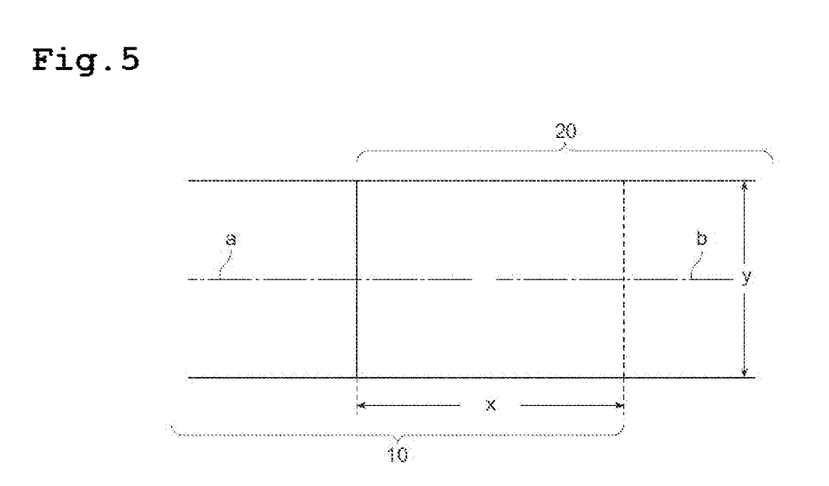
FIG. 5 is a schematic plan view illustrating an example of a connecting portion in the case where a thin glass and a tough film are superimposed to be connected to each other in the thin glass elongated body of the present invention.

FIG. 5 is a schematic plan view illustrating an example of the connecting portion in the case where the thin glass (main body) and the tough film (handling section) are superimposed to be connected to each other. Note that, although FIG. 5 illustrates one end, the other end also has the same configuration. In the case where the thin glass 10 and the tough film 20 are superimposed to be connected to each other, a length x of a superimposed portion between the thin glass 10 and the tough film 20 is preferably from 20 mm to 2,000 mm, more preferably from 100 mm to 2,000 mm, still more preferably from 150 mm to 2,000 mm, further preferably from 150 mm to 1,000 mm, particularly preferably from 300 mm to 1,000 mm. In one embodiment, the length x of the superimposed portion between the thin glass 10 and the tough film 20 may be set in accordance with a width y of the thin glass 10. The length x of the superimposed portion between the thin glass 10 and the tough film 20 and the width y of the thin glass 10 satisfy preferably a relationship of $0.01y \leq x \leq y$, more preferably a relationship of $0.05y \leq x \leq y$, still more preferably a relationship of $0.1y \leq x \leq y$, particularly preferably $0.3y \leq x \leq y$. The length x of the superimposed portion between the thin glass 10 and the tough film 20 may be the same or different at both the ends of the thin glass 10 in the length direction.

The crossing angle between a central axis a of the thin glass 10 in the length direction and a central axis b of the tough film 20 in the length direction is preferably 5° or less, more preferably 3° or less, still more preferably 1° or less, particularly preferably 0° as illustrated in FIG. 5. In the case where the crossing angle is more than 5°, when the thin glass is subjected to the treatment or the processing by the roll-to-roll process, there is a risk in that the traveling of the thin glass may lack rectilinearity to cause a decrease in processing precision. Further, the displacement and wrinkles are liable to occur at a time of take-up, and the thin glass may be broken due to the displacement and the wrinkles.

INDUSTRIAL APPLICABILITY

The thin glass elongated body of the present invention can be suitably used as a thin glass material to be subjected to the roll-to-roll process, such as a display substrate, a sensor cover, an element cover, or the like.

REFERENCE SIGNS LIST 10 thin glass
20, 20' tough film
100 thin glass elongated body

The invention claimed is:

1. A thin glass elongated body, comprising:
a main body comprising an elongated glass; and
a handling section comprising films connected to both ends of the main body in a length direction thereof,
wherein an absolute difference between a width of the elongated glass and a width of each of the films is 20 mm or less, and
wherein a product of a Young's modulus and a thickness of each of the films is 90% or less of a product of a Young's modulus and a thickness of the elongated glass.

2. A thin glass elongated body according to claim 1, wherein the main body comprises a plurality of main bodies and the handling section comprises a plurality of handling sections, and
wherein the plurality of main bodies and the plurality of handling sections are arranged alternately in the length direction.

3. A thin glass elongated body according to claim 2, wherein the plurality of main bodies are formed at an interval of 50 cm or more.

4. A thin glass elongated body according to claim 1, wherein the elongated glass has a thickness of from 10 um to 150 um.

5. A thin glass elongated body according to claim 1, wherein the elongated glass has a width of 300 mm or more.

6. A thin glass elongated body according to claim 1,
wherein the elongated glass and the films are superimposed with each other in a connecting portion between the elongated glass and the films, and
wherein a length x of the connecting portion, at which the elongated glass and the films are superimposed with each other, and a width y of the elongated glass satisfy a relationship of $0.01y < x < y$.

7. A thin glass elongated body according to claim 1, wherein a material forming each of the films comprises a resin or a metal.

8. A thin glass elongated body according to claim 1, wherein each of the films has a fracture toughness value of from 2 $MPa \cdot m^{1/2}$ to 20 $MPa \cdot m^{1/2}$.

9. A thin glass elongated body according to claim 1, wherein a coefficient of linear expansion of each of the films in a width direction thereof is one time to ten times as large as a coefficient of linear expansion of the elongated glass.

10. A thin glass elongated body according to claim 1, wherein the thin glass elongated body is formed into a roll shape.

11. A thin glass elongated body according to claim 1,
wherein the elongated glass has a thickness of from 10 μm to 150 μm and each of the films has a thickness of 5 μm to 500 μm, and
wherein the films are composed of a resin selected from the group consisting of a polyethylene terephthalate-based resin, a polyimide-based resin, a polyamide-based resin, a polyethylene naphthalate-based resin, a polycarbonate-based resin, and a cycloolefin-based resin, or a metal selected from the group consisting of aluminum, stainless steel, copper, iron, and lead.

12. A thin glass elongated body according to claim 11, wherein at least one of the films is composed of the metal.

13. A thin glass elongated body according to claim 1, wherein the films have a coefficient of linear expansion in a width direction of 50 ppm/° C. or less, and the films have a coefficient of thermal shrinkage in the width direction of 10% or less when heated at 150° C. for 30 minutes.

* * * * *

UNITED STATES PATENT AND TRADEMARK OFFICE
CERTIFICATE OF CORRECTION

PATENT NO. : 9,783,449 B2  
APPLICATION NO. : 14/435341  
DATED : October 10, 2017  
INVENTOR(S) : Takeshi Murashige et al.

Page 1 of 1

It is certified that error appears in the above-identified patent and that said Letters Patent is hereby corrected as shown below:

In the Claims

At Column 9, Lines 44-45 (Claim 4):  
Change:  
"wherein the elongated glass has a thickness of from 10 um to 150 um"  
To:  
-- wherein the elongated glass has a thickness of from 10 μm to 150 μm --

At Column 10, Line 10 (Claim 6):  
Change:  
"a relationship of 0.01y<x<y"  
To:  
-- a relationship of 0.01y≤x≤y --

Signed and Sealed this  
Tenth Day of April, 2018

Andrei Iancu  
*Director of the United States Patent and Trademark Office*